United States Patent [19]

Fornari

[11] 4,229,481
[45] Oct. 21, 1980

[54] PROCESS AND MEANS TO MAKE AROMATIC INFUSIONS

[76] Inventor: Hector C. Fornari, 615 Mexico St., Buenos Aires, Argentina

[21] Appl. No.: 916,302

[22] Filed: Jun. 16, 1978

Related U.S. Application Data

[63] Continuation-in-part of Ser. No. 725,453, Sep. 22, 1976, abandoned.

[51] Int. Cl.² ............................................. B65B 29/02
[52] U.S. Cl. ................................... 426/77; 206/0.5;
 426/82; 426/394; 426/433; 426/435
[58] Field of Search ................................. 426/77–84,
 426/394, 433, 435; 206/0.5

[56] References Cited

U.S. PATENT DOCUMENTS

| | | | |
|---|---|---|---|
| 1,489,806 | 4/1924 | Anderson | 426/77 |
| 1,775,347 | 9/1930 | Hirschhorn | 426/81 |
| 1,912,963 | 6/1933 | Blum | 426/77 |
| 2,186,087 | 1/1940 | Yates | 426/77 |
| 2,291,278 | 7/1942 | Cleaves | 426/82 |
| 2,328,017 | 8/1943 | Irmscher | 426/81 |
| 3,053,665 | 9/1962 | Irmscher | 426/83 |
| 3,193,388 | 7/1965 | Conrey | 426/80 |
| 3,384,492 | 5/1968 | Spencer | 426/83 |
| 3,556,392 | 1/1971 | Robin | 426/83 |
| 3,607,302 | 9/1971 | Beck | 426/83 |

FOREIGN PATENT DOCUMENTS

| | | | |
|---|---|---|---|
| 485145 | 7/1952 | Canada | 426/77 |
| 764607 | 11/1933 | France | 426/77 |
| 788555 | 4/1935 | France | 426/77 |

*Primary Examiner*—Steven L. Weinstein
*Attorney, Agent, or Firm*—Le Blanc, Nolan, Shur & Nies

[57] ABSTRACT

A process for preparing infusions of aromatic substances such as coffee and tea comprising the steps of confining a predetermined mass of discrete particles of said substance in a closed water permeable supporting and filtering container of predetermined dimensions, and repeatedly submerging said container with the substance therein within a predetermined volume of hot water, the relationship of the container dimensions and the mass being such that when the container is submerged in hot water the thickness of the mass therein is maintained less than a predetermined critical thickness of irreversible self-compactness, the repeated submerging and withdrawing of the container effecting repeated admission and drainage of hot water from the container thereby promoting successive states of decompaction and reversible compactness of the particles in the confined mass, until a desired degree of concentration of the infusion is attained in the body of water, and containers for carrying out the process.

12 Claims, 8 Drawing Figures

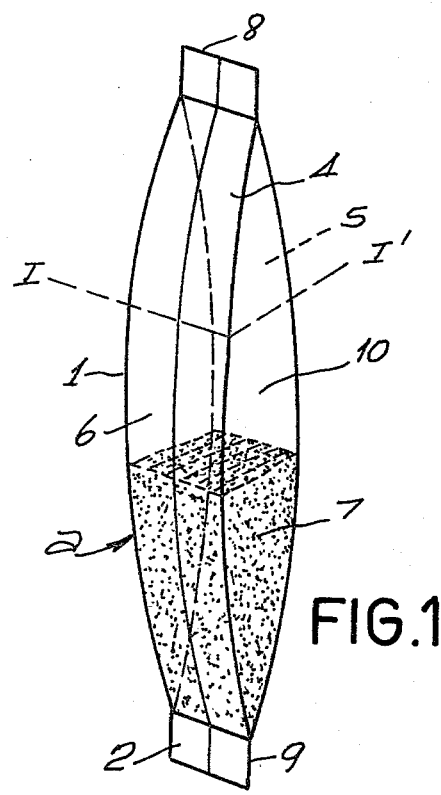
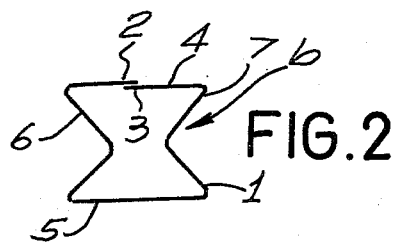
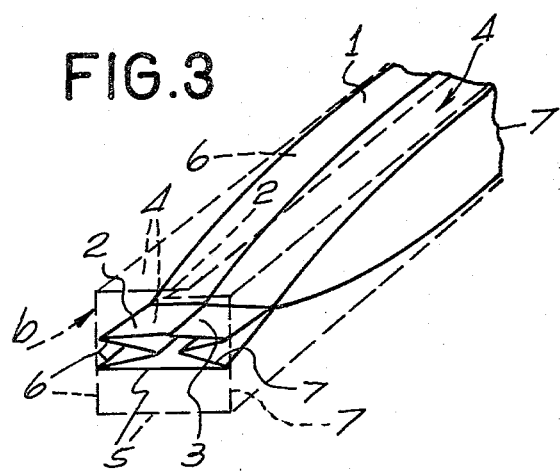
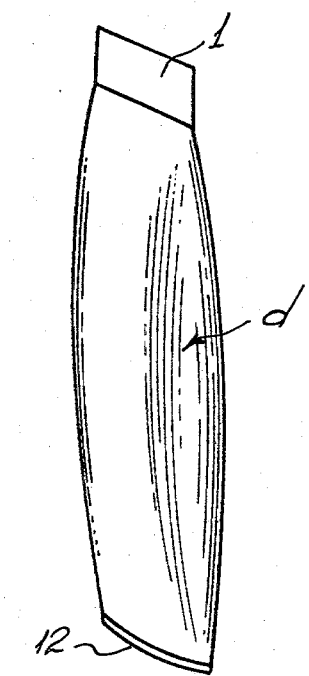
FIG.1
FIG.2
FIG.3
FIG.4

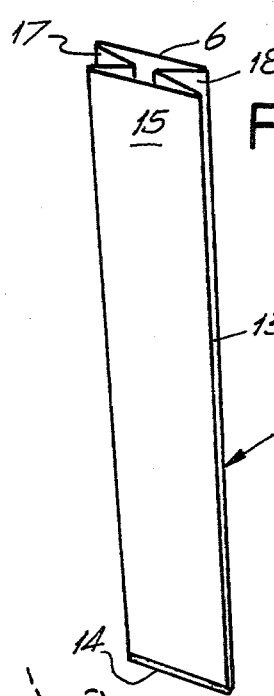
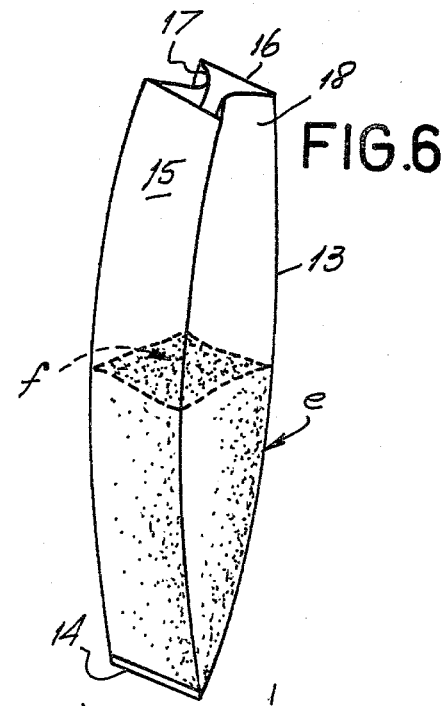
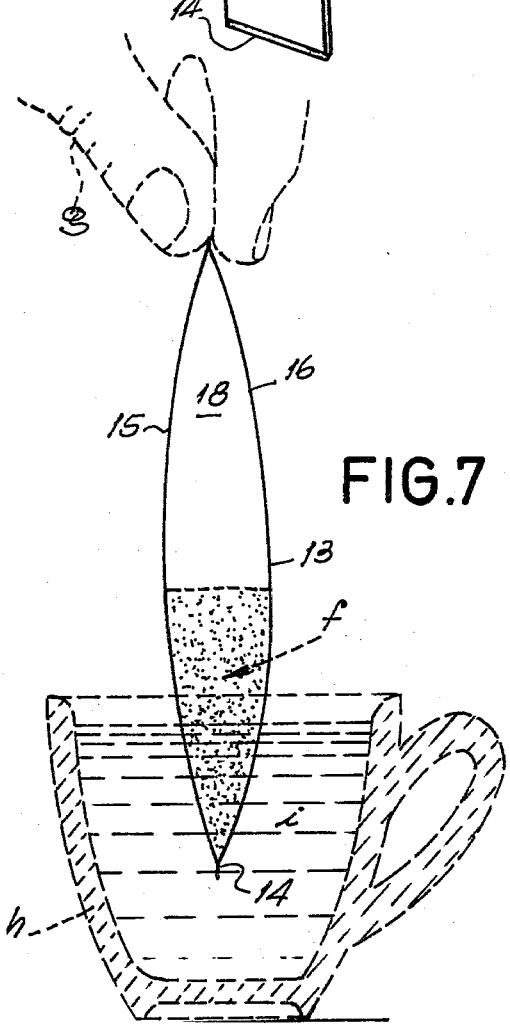
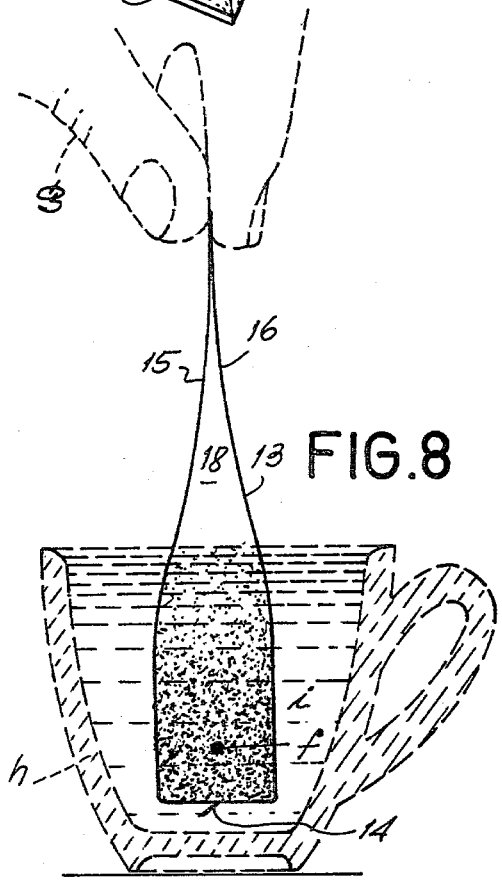

PROCESS AND MEANS TO MAKE AROMATIC INFUSIONS

This is a continuation-in-part of my copending application Ser. No. 725,453 filed Sept. 22, 1976, now abandoned.

This invention is a solution to the problem of preparing improved infusions of coffee, tea and other similar infusionable substances, by using disposable sachets.

Such infusionable aromatic solid substances as coffee and tea show marked handling difficulties when confined in small containers such as disposable filtering sachets.

It happens in the particular case of coffee that under the usual circumstances, when after being ground in the customary way it is confined in a sachet or the like and then dipped in hot water, its grains of very small size give out a first and small portion of their water soluble aromatic essential oils. These essential oils when mixed with the air trapped between the grains and the remaining sections of the sachet that are unoccupied by the material form a large amount of strong and elastic bubbles occupying all the available free spaces, that is, those spaces between the grains of particles themselves and the space not filled by the mass of grains, thus forming a sort of strong mat-plug between the material to be infused that is confined in the sachet and the surrounding water. Thus, the outside water cannot effectively enter the sachet to reach the coffee to be infused and the aromatic oils of the latter will not be freed in a greater degree than the initial very small amount. In other words, the ground coffee is "drowned" when subjected to the action of the hot water when it is confined in a container having little free space such as conventional sachet like well known tea sachets.

Besides, coffee has other behaviour characteristics when submitted to the action of hot water. It seems that these characteristics have not been known in full until now, at least in its association with the problem under consideration and it is from an elaborated observation of these facts that results what is deemed to be the groundwork or starting point of this invention that encompasses, however, other factors.

These characteristics refer to the property of ground coffee that tends to spontaneously compact itself when while contacting water absorbs a comparatively large amount of this liquid. This spontaneous compacting phenomenon has in turn the peculiarity of showing two states; i.e. one that could be called of Low Compactness, from which it still can be converted in a liquid medium, by means of the action of the water dynamically introduced inside the sachet, to the uncompacted state in which the grains are not pressed together and may be left free. The other degree of spontaneous compactness—that might be termed of High Compactness—results from a new behaviour that, as a homogeneous mass, follow the united grains of coffee. These keep seized together, resisting and finally preventing its separation (decompacting) by water. This degree of compactness is called, for a better understanding of the invention, "irreversible compactness", as in this state there is not possible by the dynamic action of the water a reversion or conversion to the state of mutual freedom of the grains without which an appropriate treatment of the grains to extract the essential oils is not possible.

The "irreversible spontaneous compaction" of coffee is in fact produced by the combined action of both the higher specific weight gained by the originally dry grains when soaked in water with the consequence that those located above press the grains below and are pressed in turn by those above them and the sealing action of the essential oils that as soon as they are given off will be dissolved in water and then confined in the interspaces between the grains and even in the porosities of the grains themselves. These phenomena are independent of the quantity of infusable substance in the sachet, of the overall volume of the sachet, and of the cross section of the sachet.

The particular phenomena that in this respect have been observed are that, on the one hand, the coffee grains when they are confined and immobilized at the bottom or adjacent areas of a container and submerged in water, behave as a homogeneous mass. Besides, and this is a fundamental fact, the whole coffee mass in accordance with its physico-chemical composition (insoluble parts and soluble components) and the degree of grinding, i.e. the grains size, show a definite and critical thickness beyond and above which it behaves as spontaneously irreversibly compacted, so that its grains cannot be easily dispersed in water. This discovery, not only by itself but joined to the consequent occurrence of the creation of suitable conditions to enable a mass of ground coffee in repeated states of dispersion in water to be subject to successive washing to effect progressive extractions of soluble oils have given as a result the process of this invention and the material means adapted to carry the invention into practice.

Tea leaves (not ground) have a similar behaviour to coffee, although this behaviour is nearly entirely due to the higher specific weight of the leaves when they are water saturated, as the soluble aromatic components have very low values of density and viscosity. In this sense, generally speaking, all the above considerations referring to coffee are valid for tea, particularly those related to the irreversible compactness level. Obviously, any other aromatic infusionable substance of a kind similar to coffee and tea, i.e. mate, the various known medicinal herbs are comprised, by equivalence, in the scope of this invention.

From the above, it follows that a main object of this invention is to make possible the preparation of infusions of aromatic substances like coffee and tea, through the use of filtering sachet or its equivalent.

Another main object of this invention is to provide a process adapted to prepare the above mentioned infusions under optimum conditions.

A further important object of this invention is the development of a practical embodiment of the above mentioned process.

There is also included among the objects of this invention the provision of aromatic infusions with a high degree of economic savings in the use of the aromatic substances and also having a high quality from the point of view of its flavour and taste.

A further important object is the possibility of optimally handling, with the help of sachets, those aromatic substances like common tea, mate, and others, without resource of a previous grinding to reduce them to a powder, as it is usually done. In the particular case of common tea, this possibility of handling the material in leaf form, with all the advantages of the disposable sachets, is of the utmost importance.

This invention has even further objects, as it is the case of its application to coffee pots, and great numbers of these objects will be appreciated in the specification that follows.

It may be said that the process to make aromatic infusions such as those of coffee and tea comprises the steps of:

confining the appropriate infusionable substance in a supporting and filtering enclosure in the required amount to make a given infusion and to the effect that it shall reach a thickness which is less than its respective critical lowest thickness of irreversible self-compactness, sinking said infusionable substance, together with a filtering and supporting container, in a quantity of hot water suitable to provide an infusion having the desired concentration, and effecting repeated washings for extracting the aromatic components of the infusionable substance, by promoting successive states of decompaction and reversible compactness of the particles forming the mass of the infusionable substance, by means of repeated admissions and discharges of water, until the desired degree of concentration of the infusion is reached.

As above mentioned the scope of this invention also embraces such means as the positive acting filter-sachets having such design that they provide for the treatment of coffee according to the above mentioned process.

The above mentioned and other features and objects of this invention and the manner of attaining them, will become more apparent and the invention itself will be best understood by reference to the following description of several embodiments of the invention taken in conjunction with the accompanying drawings wherein:

FIG. 1 is a perspective outside view of a positive action symmetric filter or sachet having two end tabs for gripping with the operator's fingers;

FIG. 2 is a section taken through I—I' of the sachet shown in FIG. 1 of the accompanying drawings;

FIG. 3 is a schematic view of the composition of planes of the end tabs of the sachet shown in FIG. 1, said planes or parts being slightly separated before taking the position in which they are sealed together;

FIG. 4 is a perspective view of a variation of the sachet of FIGS. 1, 2 and 3, which is made starting from a tube of circular section and having only one upper tab for gripping;

FIG. 5 is a perspective outside view of a variation of the embodiment of FIGS. 1 to 4, showing an empty sachet which is directly operable;

FIG. 6 is a perspective view of a sachet similar to the one illustrated in FIG. 5 but unfolded and loaded with coffee;

FIG. 7 shows the same sachet of FIGS. 5 and 6 loaded with coffee, manually closed and half introduced in a cup of water; and FIG. 8 shows, finally, the shape and position of the sachet of FIG. 7 when it has been totally introduced into the water contained in the cup.

The same symbols have been used in the different figures for equal or similar parts.

Before describing the means illustrated in the above mentioned figures and its operation, it seems to be desirable to describe and analyse in more detail the inventive process by itself and also the main embodiments thereof. So it may be said that the process of this invention is based on the principle of:

1. Arranging a definite and suitable amount of ground roasted or toasted coffee—in the amount required to provide the desired infusion—in a container, e.g. a filter-container, adapted on the one hand to suitably filter the coffee and enabling on the other hand a quick admission and discharge of water. Being given that coffee, or, better, any mass theoretically uniform of ground coffee, has its own critical thickness of irreversible self-compactness, beyond which, under practical conditions, the dispersion of the grains to be exposed to the action of water for extracting the grains for extracting soluble substances is impossible, the coffee container, in addition to being verticaloid, that is, adapted to a vertical operation, must have such a shape and dimensions as to enable on the one hand the confinement in the bottom of the container of the amount of coffee required for the volume of infusion to make, while on the other hand it must be conditioned to so arrange itself that when submerged in water its thickness will be less than the minimum thickness for irreversible self-compactness. More precisely: the sachet or container in a state of immersion should have a flat bottom and be capable of containing a liquid mass of not less than double the volume which the infusable substance achieves when it is saturated and self-compacted inside it. Such substance is provided in such a quantity that, in a state of saturated mass and spontaneously compacted in the infusion liquid and inside the container, it is capable of achieving a smaller thickness in height than the minimum critical thickness in height of irreversible self-compactness, such smaller thickness, which is of reversible self-compactness, corresponding to all spontaneous states of thickness at or under which, the mass of infusable substance maintains its natural capacity for the state of saturation and immersion in the infusion liquid, allowing the particles of the substance to separate as a result of the dynamic action of the infusion liquid when the liquid enters into the container through the walls and bottom of the container of the container being immersed in the liquid.

2. Sinking the mass of coffee jointly with its supporting and filtering container, in a mass of hot water, the latter in an amount enough to allow the provision of an infusion of the desired concentration.

3. And promoting repeated decompactness states in the mass of coffee, i.e. in the grains of the mass, which in this case keep mutually separated and more in contact with the water, by means of the filtering container, forcing the hot water of the infusion to fill and to be discharged from the inside of the container, in such a way as to produce an intense and repeated washing for extracting soluble substances while not allowing the latter to significantly pass to the gaseous state. The admission, discharge and generally the recirculation of water in the enclosure (filter-container) may be secured in various different ways, among which the following are preferred: (a) Wholly or nearly wholly sinking and removing from the infusion water the coffee contained in the enclosure or filter-container; (b) Promoting alternative volume changes in said filtering enclosure, e.g. reducing its size to expel water and then letting it to restore its original dimensions to promote the refilling with water. Now referring to such means as shown in the drawings it may be said that those of the example of FIGS. 1 to 3 comprise a closed filtering bag or sachet which is loaded with an appropriate amount of ground coffee. In said sachet, a is the body having a generally verticaloid elongated shape. It should be explained that the term "verticaloid" refers to the fact that the whole body of the sachet is conditioned with a sense of verticality, so that when without effort it is freely placed unto a horizontal surface, which may be the bottom of a container (a demitasse, a cup, a jar, etc.), it tends to arrange itself vertically, i.e. with its bottom end lying onto said surface.

This sachet is made starting from a tube b of square section (FIG. 3) made of conventional filter paper, very thin and provided with a thermoplastic adhesive coating on one face, for heat sealing. This paper is of the same kind as the one currently used for the well known tea sachets. It is well known that this paper is highly permeable to water and at the same time it filters out the solids. The tube is shaped by appropriately folding a filter paper band 1 and sealing it at its superimposed lateral edges 2 and 3.

The shape of the sachet as shown in the accompanying drawings corresponding to its inoperative condition, such as its state of non-use and adapted to be packed with others of the same kind, is generally that of an elongated double wedge and is a result of joining the respective extreme sections of two opposed walls 4 and 5 of tube b, which are drawn nearer by the simultaneous inside bending of the other two walls 6 and 7 of the same tube (FIGS. 2 and 3). By shaping the above mentioned ends result the tabs 8 and 9 having the double function of providing a better end closure and making easier the handling of the sachet in its use.

It must be made clear that, strictly speaking and as shown in FIG. 3, the side walls 6 and 7 keep interposed between walls 4 and 5 when they are joined, pressed together and sealed to form the above mentioned tabs 8 and 9 to close the sachet end.

As shown by the example of FIG. 1, the sachet is loaded with a quantity of ground coffee that for the inoperative condition of the sachet having its body a generally flattened, fills about one half of the inside space. This quantity of coffee, in accordance with this invention, has to be of such value—according to the nature and characteristics of the coffee involved—that when the sachet is unfolded and in its greatest amplitude, in the operative condition, with its enlarged base nearly flat and horizontal, the coffee is saturated in the infusioning liquid and it will occupy such a volume that a vertical thickness or height is reached that is lower than the critical lowest limit of irreversible compactness of the coffee to provide an infusion of the appropriate intensity. In all cases, both in the inoperative and in the operative condition of the sachet, there remains over the coffee occupying its bottom section, a large free section 10 (FIG. 1) which together with the bottom space enlarged under operative conditions forms the coffee decompacting chamber when it is submitted to the action of the water contained in a vessel under similar conditions to those shown in FIG. 8.

The volume relationship between the inside of the container and the infusable, saturated and self-compacted substance mass, should be such that the volume of said mass is not greater than one half of the total volume of the container in an operating state.

The sachet that is shown in FIG. 4 differs from the embodiment illustrated in the preceding figures only in that its body d is shaped from a tube of circular section. The lateral depressions of the preceding examples are not formed in this case, so that the shape of the body is generally circular or slightly oval, both for the inoperative and the operative conditions. Also this sachet is provided with only one tab 11 for handling. The bottom end is sealed at its edges 12.

Although the examples discussed in reference with FIGS. 1, 2 and 3 cover the majority of the possible embodiments of the positive action autonomous sachets of this invention, it must be understood that there is a range of forseeable variations.

Such is the case with the total supression of end tabs, or using other sections in the starting body of the sachets (e.g. rectangles, ovals, etc.).

The mode of operation with the sachets of FIGS. 1 to 4 is practically the same for all the embodiments thus illustrated. The sachet is gripped at its upper end—by the tab arranged to this effect in the sachets provided with those tabs in the case of the appropriate examples——and while keeping them in the vertical position that they naturally take, they are slowly dipped, starting from the bottom end, into the vessel (a demitasse, a cup, a jar, etc.) in which the water required for the infusion has been placed. Obviously, for a given quantity of coffee contained in a sachet, the quantity of water appropriate to make an infusion of the desired intensity should be used. This first step may be inverted by first placing the sachet into the vessel and then pouring the water over. Anyway, once the sachet has been submerged into the water, it must be partially or totally raised and lowered until it is out or substantially out of the vessel, to so promote successive decompactions of the coffee mass while the water is drained off with the consequent washing of the coffee aromatic soluble substances and besides to promote a further admission of water when it is lowered again. This operation, repeated several times, promotes a renewed extraction of the soluble aromatic components of the coffee.

When through these repeated operations the desired concentration of the infusion has been reached, the sachet is taken out and the infusion will be ready for drinking. These sachets may also be operated by leaving them practically all the time in the vessel and promoting the exit of the water enriched with dissolved coffee and the admission of new water through the action of a spoon used to press the submerged wall of the sachet and alternately retired to enable a further admission of water. A mixed mode consists in raising and lowering the sachets and now and then pressing with a spoon. What is important is to promote a repeated admission and discharge of water from the sachet.

It should be also pointed out that when the water initially enters the sachet, it simultaneously wets the sachet's walls, at least in its bottom half, as well as the inside coffee. The increased weight of the coffee (it is now a water-impregnated coffee) and the softening of the paper of the sachet body, force the whole mass of coffee to descend and exert pressure on the extreme bottom or base section of the sachet, which is notably widened and the same thing happens with the nearest part of the body that is also widened upto its maximum section. Thus the base is considerably widened, markedly in the sachets of square or rectangular section as in the embodiments of FIGS. 1 to 4, and it takes at the bottom a generally prismatic, cylindrical shape or the like.

Finally, in reference with the embodiment shown at FIGS. 5 and 7, there is a positive action sachet as shown in FIGS. 1 to 4 but opened at the top and empty. This is so because in a possible further embodiment of the invention it is possible to provide empty sachets to be later suitably filled with coffee. This sachet e has a body 13 shaped like a nearly flat wedge (FIG. 5) ending at the bottom in a narrow sealing belt 14. It looks externally as a relatively thick rectangular plate, as the side walls 15 and 16 and the interleaved remaining walls 17 and 18, which are folded at the center, form a thick laminar body. When using this sachet, it is slightly opened, as shown in FIG. 6, to be filled with the required amount of coffee f. The sachet is then gripped with the fingers from its top by pressing together the faces 15-16 (FIG. 7) for shaping the sachet like the sachet of the embodiments of FIGS. 1 to 4, with its top end closed and provided with a gripping tab. The bottom end of the sachet is then introduced into the demitasse h containing the water i and operated according to the method disclosed in reference with FIGS. 1 to 4.

FIG. 8 shows the sachet when submerged, with the water of the demitasse inside to decompact, i.e. to slightly separate, the small grains of ground coffee contained inside. The bottom section of the sachet is markedly enlarged as a result of the decompacting of the coffee and takes a nearly prismatic shape as shown in FIG. 8.

Of course, when the sachet and its contents are raised above the liquid level, the inside water, which has dissolved part of the essential oils of the said coffee, is drained by gravity off the sachet and falls into the liquid remaining in the demitasse. When repeating one or more times the introduction and withdrawal of the sachet, occur new extractions, by washing, of the essential oils and the latter enrich the water in the demitasse, thus providing an infusion of increasing concentration.

When carrying this invention into practice, changes may be introduced in the conditions and steps of the method as disclosed, as well as in the constructive means used to operate said method, all this being comprised in the scope of the following claims.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A process for infusing aromatic infusable particulate substances, such as coffee and tea, comprising: confining the substance in an elongated water permeable and filtering container capable of moving vertically for immersion in a liquid that is principally water; said container in a state of immersion having a flat bottom, the infusable aromatic substance becoming a saturated and self-compacted infusable mass upon immersion; the volume relationship between the inside of the container and said saturated self-compacted infusable mass is such that the volume of said infusable mass is not greater than one half of the total volume of the container in an operating immersed state so that the container contains, in a vessel containing liquid to be infused, a liquid mass of not less than double the volume which the infusable mass achieves when it is saturated, not dispersed and self-compacted inside the container, the infusable substance being provided in such a quantity that, in a state of saturated mass and spontaneously compacted in the infusion liquid and inside the container, it is capable of achieving a smaller thickness in height than its minimum critical thickness of irreversible self-compactness, such smaller thickness, which is of reversible self-compactness, corresponding to all spontaneous states of thickness at or under which the mass of infusable substance maintains its natural capacity for the state of saturation and immersion in the infusion liquid while allowing the particles of the substance to separate as a result of the dynamic action of the infusion liquid when the liquid enters into the container through the walls and bottom of the container on the container being immersed in the liquid; submerging the container containing said infusable substance in a vessel having a sufficient quantity of hot infusion liquid to obtain an infusion of a desired concentration, and effecting successive admissions and drainages of the infusion liquid in the container to promote the corresponding self-decompactness and reversible self-compactness of the infusable substance mass until a desired degree of concentration of the infusion is obtained in said vessel.

2. A sachet package for preparing infusions of particulate aromatic substances such as coffee and tea comprising an elongated closed water permeable supporting and filtering container of predetermined dimensions which in a state of immersion has a flat bottom, and a predetermined quantity of an infusable aromatic substance within said container, the infusable aromatic substance becoming a saturated and self-compacted infusable mass upon immersion; the volume relationship between the inside of the container and said saturated self-compacted infusable mass is such that the volume of said infusable mass is not greater than one half of the total volume of the container in an operating immersed state so that the container contains, in a state of immersion, in a vessel containing liquid to be infused, a liquid mass of not less than double the volume which the infusable mass achieves when it is saturated and self-compacted inside the container, the infusable substance being provided in such a quantity that, in a state of saturated mass and spontaneously compacted in the infusion liquid and inside the container it is capable of achieving a smaller thickness than its minimum critical thickness in height of irreversible self-compactness, such smaller thickness, which is of reversible self-compactness, corresponding to all spontaneous states of thickness at or under which the mass of infusable substance maintains its natural capacity for the state of saturation and immersion in the infusion liquid and allows the particles of the substance to separate as a result of the dynamic action of the infusion liquid when the liquid enters into the container through the walls and bottom of the container upon the container being immersed in the liquid in said vessel.

3. The sachet package defined in claim 2, wherein said package is of such structure that when immersed in said liquid it achieves a substantially flat bottom greater than the cross sections thereabove, and said package is capable of containing a volume of said liquid mass of not less than double the volume of the contained infusable mass when saturated with said liquid.

4. A sachet assembly as defined in claim 2, wherein said container is a bag of filter paper having an expansible elongated body of such dimensions that when expanded by the mass of said substance therewithin the mass attains a thickness at its bottom that is smaller than said critical thickness of the mass and there is a substantial free space above said mass.

5. A sachet assembly as defined in claim 4, wherein said bag body has longitudinally extending side folds enabling it to be expanded to operative condition by introduction of said substance.

6. A sachet assembly as defined in claim 4, characterized in that two of the walls of said elongated body are mutually opposed and between them are interposed another two also mutually opposed walls, all of said walls being joined at their ends, said walls being such that the sachet body is shaped as a double wedge.

7. A sachet assembly as defined in claim 6, characterized in that said body is shaped from a rectangular tube, and two opposed faces are joined together in a straight line at the bottom end.

8. A sachet assembly as defined in claim 4, characterized in that said body is shaped from a tube having a closed curve section.

9. A sachet assembly as defined in claim 4, characterized in that said body has a generally symmetrical shape in the longitudinal direction merging toward two substantially equal thickness closed ends.

10. A sachet assembly as defined in claim 4, characterized in that the bottom base end of said body has an external flat extension shaped as a supplementary tab formed by a flattening of an associated section of said body.

11. A sachet assembly as defined in claim 10, characterized in that the opposite two ends of the sachet body are substantially alike and they each end in a supplementary tab, each tab being formed by flattening the associated section of the respective body end.

12. A sachet assembly as defined in claim 4, characterized in that said body possesses two mutually converging plane and opposite faces, said faces forming at the body base a dihedral angle.

* * * * *